United States Patent Office 2,731,186
Patented Jan. 17, 1956

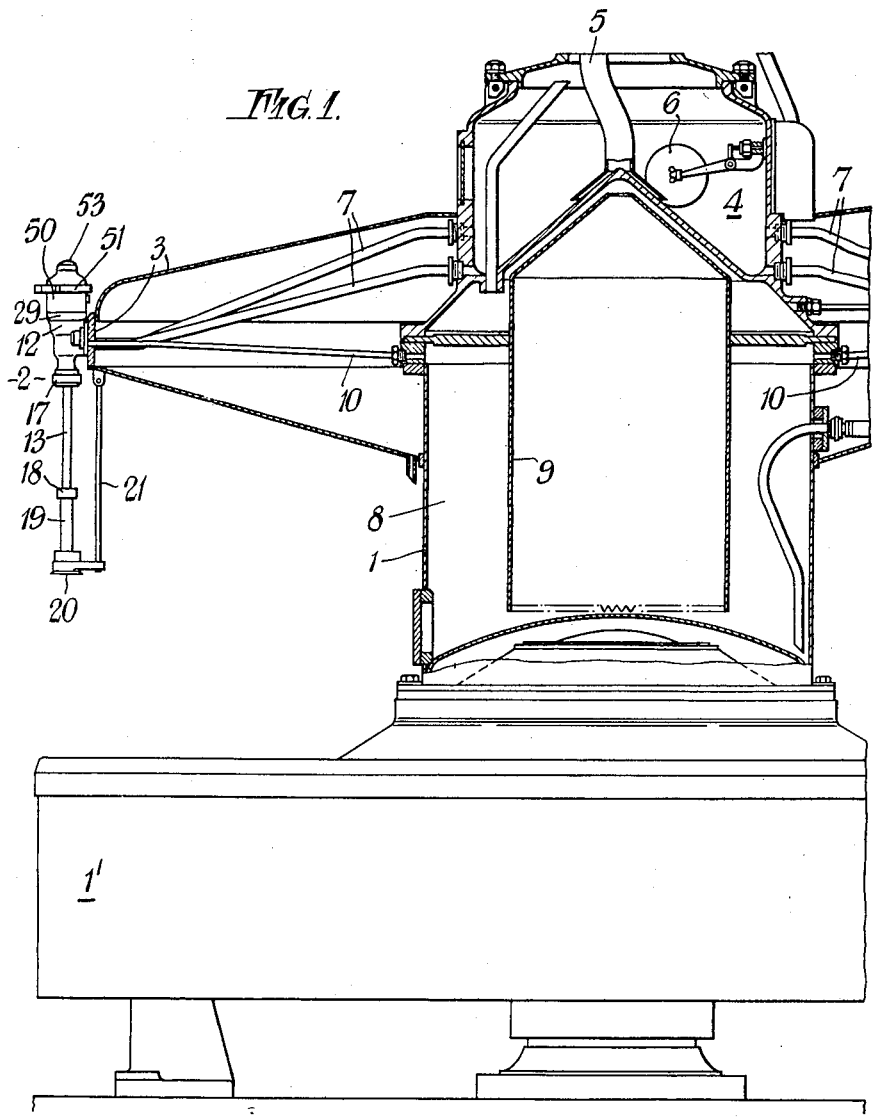

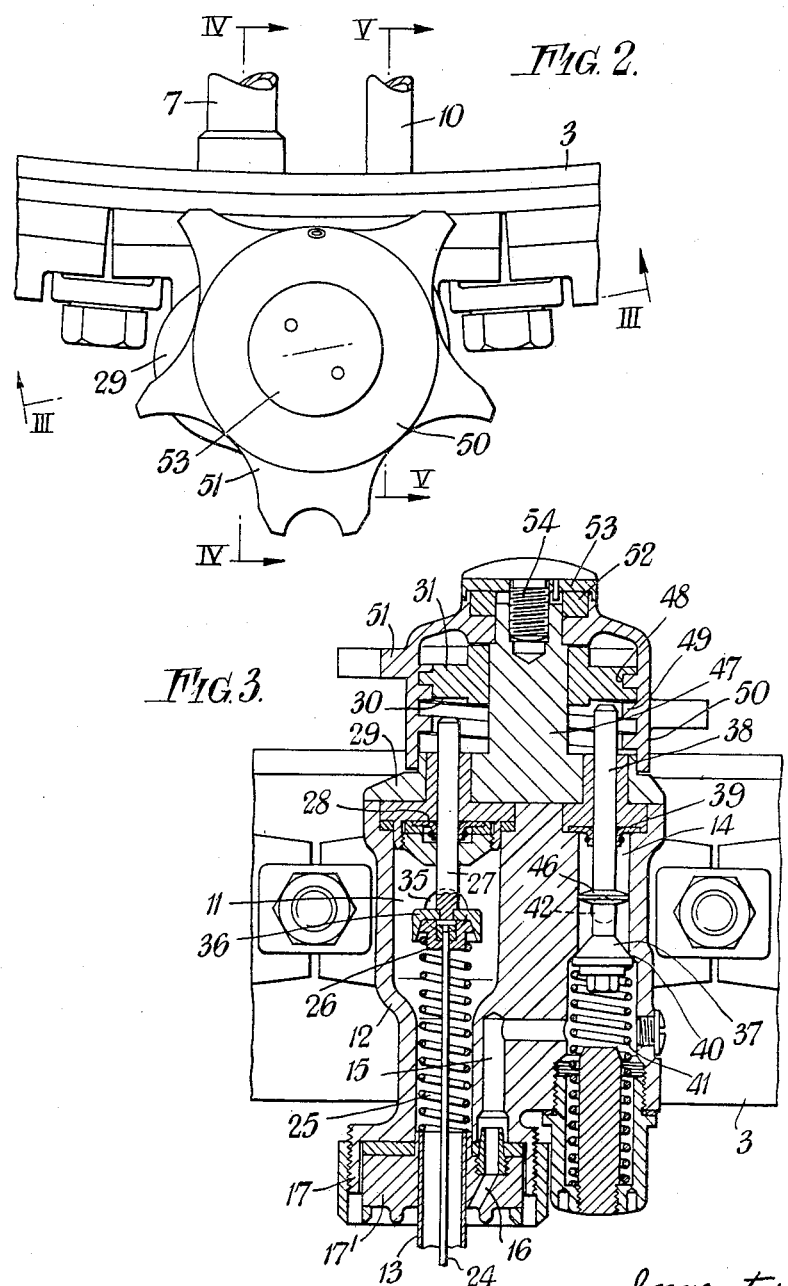

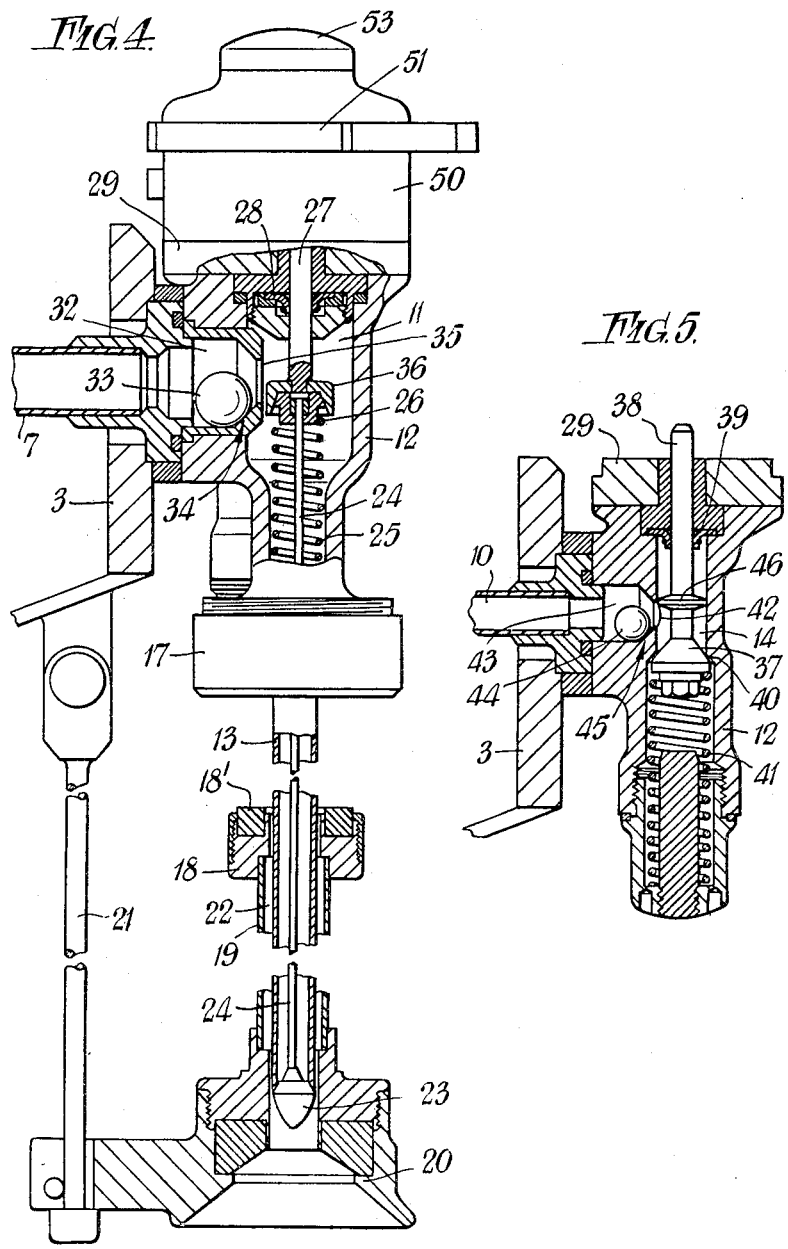

2,731,186

LIQUID-BOTTLING MACHINES

Douglas Percy Shoolbred Fox and William Arthur Clarke, London, England, assignors, by mesne assignments, to Vickers-Armstrongs Limited, London, England, a British company Application May 25, 1953, Serial No. 357,213

Claims priority, application Great Britain June 16, 1952

3 Claims. (Cl. 226—115)

This invention concerns improvements relating to automatic rotary machines for filling vessels such as bottles with liquid and is more especially concerned with improved and simplified filling heads for such machines.

According to the invention, in a filling head for such a machine, valve means operated automatically in step-by-step fashion for controlling the admission of liquid and counter-pressure to a vessel consists solely of a valve, for controlling the liquid, which is seated at the foot of the filling tube and is positively operated by mechanical means and a valve controlling a single port for the admission of counter-pressure. The valve controlling the counter-pressure may be a valve movable axially of itself, preferably a valve of the poppet type. The two valves may be operated by a single mechanical actuating element.

It has already been proposed to provide safety ball valves in liquid and counter-pressure passages of a filling head, which valves close automatically under dangerous abnormal conditions. According to the present invention, provision is made for a counter-pressure safety valve to be held off its seating while the operated counter-pressure valve is in an intermediate or an initial open position.

The invention permits of substantial simplification of the filling heads and, indeed, of the whole machine. There are fewer moving parts than heretofore and valves of the rotary plug type are avoided, so that potential sources of trouble due to wear are substantially reduced.

Filling heads in accordance with the invention can be used for bottling beer at moderate pressures or for bottling carbonated beverages at substantially higher pressures.

A preferred form of embodiment of the invention will now be more fully described by way of example and with reference to the accompanying drawings, in which:

Figure 1 is a vertical section through as much of a bottling machine, particularly for bottling beer, as is necessary for an understanding of the present invention, Figure 2 a plan view of valve-operating means for a filling head, Figure 3 a vertical section through a filling head on the line III—III in Figure 2, Figure 4 a vertical section through the said head on the line IV—IV in Figure 2, the filling tube and associated parts being also shown in section, and Figure 5 a vertical section on the line V—V in Figure 2.

As illustrated in Figure 1, the machine consists generally of a rotary body 1 carrying a plurality of readily detachable filling heads 2 spaced around the periphery of an overhanging ring structure 3. Bottles are brought into operative filling relation with the heads by a bottle-lift arrangement (not shown) of per se known kind which is carried by the rotary table 1'. Liquid is supplied to a central upper tank 4 through a pipe 5 under the control of valve means regulated by a float 6 which maintains a constant liquid level in the said tank. From the tank 4, liquid passes through individual pipes 7 to the respective filling heads 2. The lower part of the body 1 forms the pressure chamber 8 of a filling-level control device containing a central bell 9 in which a liquid column is sustained by the pressure of air or gas in the chamber 8 surrounding it. The pressure in the chamber 8, transmitted through individual pipes 10 to respective filling heads 2, affords the counter-pressure utilised in the bottle-filling operation. The precise arrangements for supplying the liquid and providing the counter-pressure form no part of the present invention and will therefore not be further described.

In each head 2, the liquid pipe 7 communicates (Figure 4) through a cavity 11 in the interior of a casing part 12 of the head with the upper end of the filling tube 13 (Figure 3). The counter-pressure pipe 10 communicates (Figure 5) through a cavity 14 in the said casing 12 and through passages 15 (Figure 3) with a port 16 in a fixed abutment 17 against which a movable abutment 18 (Figure 4) is brought to bear by way of sealing members 17', 18' before a bottle is filled. The abutment 18 is mechanically connected by an outer tube 19 to the usual corrector cone 20 which receives the mouth of the bottle, these parts 18—20 enclosing the tube 13 and being slidable over the same with guidance afforded by a rod 21 suspended from the ring structure 3. The counter pressure is communicated to the bottle from the port 16 through the constantly open annular passage 22 formed between the inner tube 13 and, in succession, the abutment 18, the outer tube 19 and the corrector cone 20. Each filling head comprises only one liquid passage controlled by one operated valve and one counter-pressure passage controlled by one operated valve.

The liquid-controlling valve is a pear valve 23 disposed at the foot of the filling tube 13, the per se known general arrangement of the valve and tube and of the associated abutments 17, 18, outer tube 19 and corrector cone 20 being similar to that illustrated in the specification of United Kingdom Patent No. 600,359. The rod 24 carrying the valve 23 passes up through the tube 13 and is loaded upwardly towards the valve-closing position by a compression spring 25 acting upon a button 26 on the rod and located in the cavity 11 in the casing 12. For opening the valve 23, the button 26 is depressed by a co-axial push rod 27 which extends through a seal 28 under the cover 29 of the casing 12 and is engageable by the face 30 (Figure 3) of a tappet plate 31 hereinafter to be described. Liquid from the tank 4 is admitted to the cavity 11 from the pipe 7 by way of a small lateral chamber 32 containing a ball valve 33 (Figure 4). The ball valve 33 is designed and arranged so that a surge of liquid from the pipe 7, such as occurs with a broken bottle, will carry the ball up an incline 34 into a port 35 between the chamber 32 and the cavity 11. In this closed position, part of the ball projects into the path of an enlarged foot portion 36, in which engages the button 26, of the push rod 27. This ensures that the ball will be positively forced off its seating in the port 35 during re-closure of the pear valve 23 if it has closed for any reason during opening of the said valve, danger of sticking of the ball in its seating being thereby avoided. Preferably the ball is of Phosphor bronze, such a valve being easier to design and keep clean than a non-metallic floating ball.

The counter-pressure valve is a poppet valve 37 (Figures 3 and 5) formed at the lower end of a second push rod 38 which also extends through a seal 39 under the cover 29 of the casing 12 and is engageable by the tappet plate 31. The valve 37, which has a conical closure surface is urged upwardly against a conical seating 40 by a helical compression spring 41 disposed under it. Counter-pressure from the filling-level control device of the machine is admitted from the pipe 10 just above this seating 40 through a lateral port 42 in a small chamber 43 containing a Phosphor bronze ball valve 44. The ball is also designed and arranged so that it is capable of running up an incline 45 into the port 42 where it will project into the path of a doubly conical shoulder 46 provided on the push rod 38 just above the poppet valve 37. In the closed position of the said valve (Figure 5), the shoulder 46 is located inoperatively above the port 42. In an intermediate position, namely an initial open position of the valve 37, the shoulder 46 stands opposite the port 42 and will positively obstruct closure of the ball valve 44. Finally, in an extreme, fully open, position of the valve 37, the shoulder 46 is located inoperatively below the port 42. Thus, in each opening and closing operation of the poppet valve 37, the shoulder 46 passes through a position in which it will engage the ball valve 44, if this is in the closed position, and force it out of its seating in the port 42. On the one hand, it is thus ensured that the ball valve 44 is open when the poppet valve 37 is in the intermediate position and, on the other hand, danger of the ball sticking in its seating is avoided.

The tappet plate 31 is mounted so as to be axially slidable, but non-rotatable, on a square post 47 (Figure 3) standing up from the cover 29 of the casing 12. At its edge, the plate 31 has a screw-thread 48 engaging a three-start thread 49 provided inside a bell-shaped body 50 forming the hub of a star wheel 51. A thrust bearing ring 52 is provided between the body 50 and a cap piece 53 secured to the post 47 by a screw 54. The per se known general design of the star-wheel 51 itself and general arrangement of fixed and automatic stops coacting therewith to produce its stepwise rotation may be similar to those described in the aforesaid United Kingdom specification No. 600,359.

The arrangement is designed to produce the following cycle:

Normally both the pear valve 23 and the poppet valve 37 are closed. After a bottle has been brought by the bottle lift into operative relation with the corrector cone 20 of the filling head so as to raise the abutment 18 into sealed contact with the abutment 17, the star wheel 51 is engaged by a first operational stop and advanced through one step. The tappet plate 31 is displaced downwardly by the action of the thread 49 and causes the poppet valve 37 to open to the intermediate position, admitting counter-pressure to the bottle from the pipe 10 via 14—16, 22. In this position, due to the shoulder 46, the counter-pressure ball valve 44 cannot close under the effect of the initial admission of pressure. The star wheel 51 is then engaged by a second stop and advanced through a further step. The tappet plate 31 is depressed further and opens the pear valve 23 fully to admit liquid to the bottle from the pipe 7 via 11, 13 and at the same time opens the poppet valve 37 to the extreme position. At this stage, surges of liquid and counter-pressure, such as may be caused by a broken bottle or other abnormal condition, can carry the respective ball valves 33 and 44 into their ports 35 and 42 so as to shut off the liquid and counter-pressure from the bottle. Normally, however, the bottle is filled with liquid against the counter-pressure. Thereafter, upon engagement with a third stop, the star wheel 51 and tappet plate 31 are returned through one step. The pear valve 23 is closed and the liquid supply to the bottle is cut off. Finally, upon engagement with a fourth stop, the star wheel 51 and tappet plate 31 are returned to the original position, so that the poppet valve 37 also is closed and the counter-pressure cut off from the bottle. If, on the other hand, due to an abnormal condition, the respective ball valves 44, 33 have closed upon opening of the poppet valve 37 and pear valve 23, they are positively forced off their seatings during reclosure of the said poppet and pear valves as described above, leaving the filling head ready for the next cycle.

Instead of the screw tappet plate 31, a face cam rotatable about a vertical axis by the star wheel 51 may be provided for operating the valves 23, 37 through the push rods 27, 38. The former device, however, has advantages, particularly in respect of freedom from wear.

If desired, the supply of liquid and/or counter pressure to the filling heads 2 may be effected by way of ring manifolds. An annular tank may be employed in well known manner in place of the central tank 4.

We claim:

1. A filling head for an automatic rotary machine for filling vessels with liquid under counter pressure and having automatic valve means for controlling the sequential admission of liquid and counter-pressure to a vessel, the said valve means comprising control valves for the liquid and counter-pressure respectively, mechanical actuating means for the said valves, a counter-pressure safety valve in series with said counter-pressure control valve, and holding-off means operatively associated with said actuating means for said counter-pressure control valve and engageable with the said safety valve for holding it off its seating while the counter-pressure control valve is in an intermediate, open, position.

2. A filling head according to claim 1, wherein the holding-off means comprises an abutment member connected to the actuating means for the counter-pressure control valve and engageable with the counter-pressure safety valve for forcing it off its seating, if it is closed, when the said control valve is moved from its fully open to its closed position.

3. A filling head for an automatic rotary machine for filling vessels with liquid under counter pressure and having automatic valve means for controlling the sequential admission of liquid and counter-pressure to a vessel, the said valve means comprising control valves for the liquid and counter-pressure respectively, mechanical actuating means for the said valves, a liquid safety valve in series with the liquid control valve and an abutment member connected to the actuating means for the liquid control valve and engageable with the liquid safety valve for forcing it off its seating, if it is closed, when the said control valve is moved from its open to its closed position.

References Cited in the file of this patent

UNITED STATES PATENTS

| | | |
|---|---|---|
| 1,771,422 | Suiter | July 29, 1930 |
| 1,985,767 | Demarkus | Dec. 25, 1934 |
| 2,118,436 | Kantor | May 24, 1938 |
| 2,170,469 | Carter | Aug. 22, 1939 |
| 2,186,526 | Greiner | Jan. 9, 1940 |
| 2,239,364 | Kantor | Apr. 22, 1941 |
| 2,372,899 | Kantor | Apr. 3, 1945 |
| 2,382,696 | Milleville | Aug. 14, 1945 |
| 2,640,640 | Meyer | June 2, 1953 |

FOREIGN PATENTS

| | | |
|---|---|---|
| 20,726 | Austria | July 25, 1905 |
| 237,720 | Germany | Oct. 3, 1911 |